United States Patent Office 2,981,650
Patented Apr. 25, 1961

2,981,650

ADHESIVES, CEMENTS AND THE LIKE

Erich Bäder, Hanau (Main), and Otto Schweitzer, Konigstein (Taunus), Germany, assignors to Deutsche Gold- und Silber-Scheideanstalt vormals Roessler, Frankfurt am Main, Germany No Drawing. Filed Feb. 21, 1956, Ser. No. 566,781

Claims priority, application Germany Feb. 25, 1955

8 Claims. (Cl. 154—129)

The present invention relates to improved adhesive or cement compositions which essentially comprise a monomeric unsaturated polymerizable compound which are polymerized with the aid of a catalyst system, such as a redox system.

It is known that vinyl compounds can be polymerized in bulk with the aid of a catalyst system comprising oxygen or percompounds and compounds such as tertiary amines which are capable of forming labile amine oxide. Preferably, mixtures are subjected to polymerization containing a dispersion of a polymeric compound in a monomeric polymerizable compound. Such mixtures can be employed as cements or adhesives. Adhesives are also known in which the polymeric material is swollen by or dissolved in a polymerizable compound. The catalysts employed in addition to the usual components also should contain a tertiary amine. Furthermore, adhesives are known which contain polymerizable compounds, preferably with the addition of plastics, which are polymerized with the aid of a redox system catalyst. It is also known to add compounds containing quadrivalent sulfur as polymerization accelerators in such compositions. In addition, a bonding process is known in which viscous solutions of high molecular compounds in polymerizable vinyl compounds with the addition of peroxide catalysts and reducing agents are used.

It has also been proposed to employ an admixture of a monomeric polymerizable compound, such as monostyrene, with a monomeric unsaturated hydrophilic compound, such as acrylic acid, methacrylic acid, acrylic acide amide or methacryclic acid amide, as adhesive compositions. Poly functional cross-linking compounds, such as divinyl benzene or divinyl toluene, can also be added to such mixtures. In addition, vinyl ethers, or higher esters of acrylic acid or methacrylic acid or maleic acid anhydride, may also be added to such mixtures.

According to the invention, it was unexpectedly found that the properties of adhesives of the type described, which essentially are composed of a liquid monomeric unsaturated polymerizable compound, preferably in combination with a polymeric compound, and are polymerized with the aid of a catalyst system, preferably a redox system, can be considerably improved when they also contain at least one polymer containing the grouping (—CH$_2$—CCl=CH—CH$_2$—)$_n$ in which $n$ is an integer.

Such polymers are known in the art under the name neoprene, which are produced by the polymerization of 2-chlorobutadiene-1,3. The quantity of neoprene employed in the adhesive compositions can vary within wide ranges, but it has been found advantageous if the quantity employed is below 30% of the entire mixture and preferably below 15%, for example, between 0.5% and 5.0%.

The neoprene types which have not been modified with sulfur and do not contain sulfur or sulfur compounds, such as thiuramdisulfide, have been found especially suited for the purposes of the invention.

It was further found that the properties of the adhesives according to the invention can be still further improved by incorporating therein a nitrile of an unsaturated acid, preferably acrylonitrile or methacrylonitrile. The best results are obtained when the quantity of such nitriles does not exceed 10% of the entire adhesive composition and preferably amounts to 1 to 3%.

The properties of the adhesive compositions according to the invention can also be improved by the addition of esters of fumaric or maleic acid and especially by the addition of fumaric acid dimethyl ester. Preferably, the quantity of such esters employed is less than 5% of the entire composition.

Finally, it was also found that it is advantageous to incorporate the so-called "casting resins," that is, condensation products of polyhydric, if desired, unsaturated, alcohols with polybasic, if desired, unsaturated, carboxylic acids, such as the condensation product of maleic acid and ethylene glycol, to the compositions according to the invention. Preferably, the quantity of such casting resin employed is less than 10% of the entire composition.

Redox systems of known type can be employed for hardening the adhesive composition according to the invention. If desired, small quantities of stabilizers, such as hydroquinone, can be added thereto.

The compositions according to the invention can also contain further known additives, such as coloring agents, filters, for example, finely divided oxides, carbon black, metal bronzes and litharge. In some instances, it is also advantageous to add vulcanization accelerators to the compositions according to the invention.

The adhesive and cementing compositions according to the invention are marked by an adhesiveness and tenacity which previously could not be attained and can be employed with special advantage for gluing or joining metals and especially light metals. Heating is not necessary in their use. They harden in a few minutes at room temperature and reach their maximum strength after a few hours.

The following are examples illustrating several adhesive compositions according to the invention:

|  | 1 | 2 | 3 |
|---|---|---|---|
| Powdered polystyrene | 32.1 | 39.5 | 43.3 |
| Mono-styrene | 55.2 | 50.2 | 47.1 |
| Casting resin (maleic acid ethylene glycol condensation product) |  | 1.7 | 1.6 |
| Divinyl benzene | 4.0 | 2.2 | 2.1 |
| Acrylic acid | 2.6 | 1.6 | 1.5 |
| Acrylonitrile |  | 0.8 | 0.7 |
| Fumaric acid dimethyl ester | 3.3 | 1.5 | 1.4 |
| Neoprene | 1.7 | 1.5 | 1.4 |
| Diethanol p-toluidine | 1.1 | 1.0 | 0.9 |
|  | 100.0 | 100.0 | 100.0 |

These compositions were thoroughly mixed with 4% of a dispersion of 1 part of benzoyl peroxide in 1 part of dioctyl phthalate, and then quickly applied to the surfaces of the parts to be joined.

Aluminum strips, 85 x 20 x 2 mm. were joined with a 5 mm. overlap with these mixtures. After the joints hardened, it was found that they had a shearing strength of 230–260 kg./cm.$^2$.

The adhesive strength of a known adhesive mixture (U.S.A. Patent 2,461,553) of the following composition was measured in comparison:

| | Parts |
|---|---|
| Neoprene | 15 |
| Cumarone resin | 30 |
| Zinc oxide | 1 |
| Mercaptobenzimidazole | 0.2 |
| Toluene | 75 |

This solution was painted on the aluminum strips and after the major portion of the solvent had evaporated, the strips were joined under pressure. After hardening at room temperature, the joints had a shearing strength of 1.5 to 2.0 kg./cm.$^2$. Even after four hours' heating at 90° C., the shearing strength only increased to 15–22 kg./cm.$^2$.

We claim:

1. A method of adhesively uniting metal surfaces which comprises applying between the surfaces to be united a composition comprising an unsaturated liquid monomeric polymerizable organic compound containing $a{>}C{=}CH_2$ group which can be polymerized with the aid of a catalyst, at least one polychloroprene polymer produced by the polymerization of 2-chlorobutadiene-1,3 and another powdered polymeric compound, the quantity of polychloroprene polymer being 0.5 to 15% of the adhesive composition as an adhesive for the surfaces to be adhesively united and effecting bulk polymerization of such composition while in contact with the surfaces to be united in the presence of a catalyst.

2. The process of claim 1 in which said polymer is devoid of sulfur and sulfur compounds.

3. The process of claim 1 in which the adhesive composition in addition contains up to 10% of a nitrile of an unsaturated fatty acid.

4. The process of claim 1 in which the adhesive composition in addition contains 1 to 3% of a nitrile of an unsaturated fatty acid.

5. The process of claim 1 in which the adhesive composition in addition contains an ester of an acid selected from the group consisting of maleic acid and fumaric acid, the quantity of such ester being less than 5% of the adhesive composition.

6. The process of claim 12 in which the adhesive composition in addition contains fumaric acid dimethyl ester, the quantity of such ester being less than 5% of the adhesive composition.

7. The process of claim 1 in which the adhesive composition in addition contains a condensation product of a polyhydric alcohol with a polybasic carboxylic acid, the quantity of said condensation product being less than 10% of the adhesive composition.

8. The process of claim 1 in which said monomer is styrene and said powdered polymer is powdered polystyrene.

References Cited in the file of this patent

UNITED STATES PATENTS

| 2,029,410 | Carothers et al. | Feb. 4, 1936 |
|---|---|---|
| 2,356,091 | Roedel | Aug. 15, 1944 |
| 2,400,612 | Sprague | May 21, 1946 |
| 2,418,978 | Mertens | Apr. 15, 1947 |
| 2,476,455 | Roush | July 19, 1949 |
| 2,628,180 | Iverson | Feb. 10, 1953 |
| 2,658,050 | Signer et al. | Nov. 3, 1953 |
| 2,658,051 | Signer et al. | Nov. 3, 1953 |
| 2,700,185 | Lee | Jan. 25, 1955 |
| 2,791,528 | Gross | May 7, 1957 |
| 2,807,602 | Schnell et al. | Sept. 24, 1957 |

FOREIGN PATENTS

| 593,072 | Great Britain | Oct. 8, 1947 |
|---|---|---|
| 679,562 | Great Britain | Sept. 17, 1952 |

OTHER REFERENCES

Flory: "Principles of Polymer Chemistry," pages 31 to 34, Cornell Univ. Press, Ithaca, N.Y., 1953.

"The Chemistry of Synthetic Resins," Ellis, vols. I and II, 1935, pages 246–251.